April 23, 1968   L. J. GAUDET   3,379,287
PLURAL ACTUATED BRAKE SYSTEM
Filed March 18, 1966   3 Sheets-Sheet 3
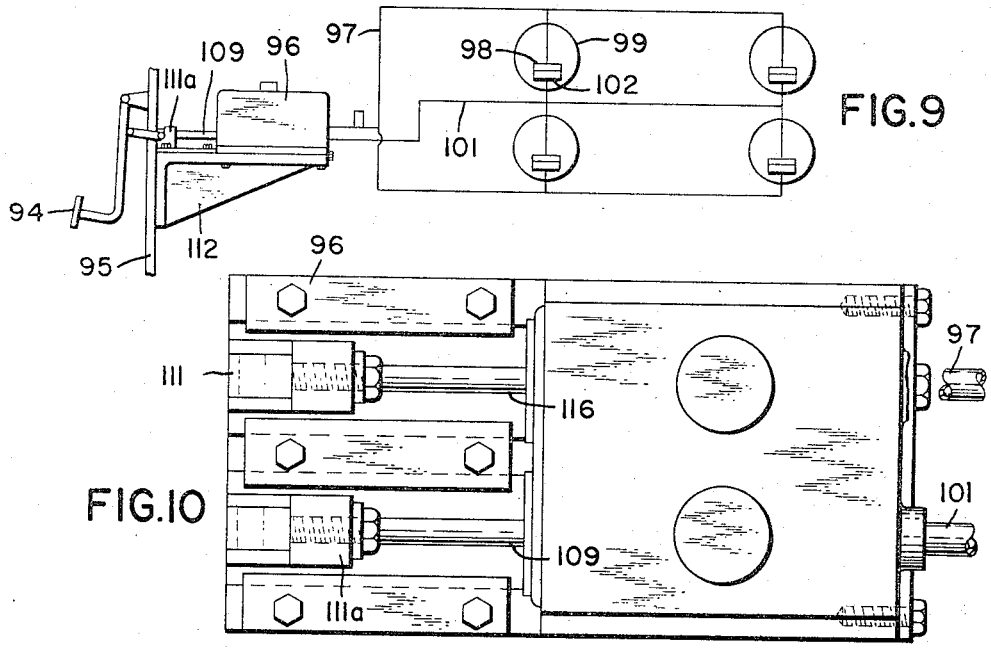
FIG. 9
FIG. 10
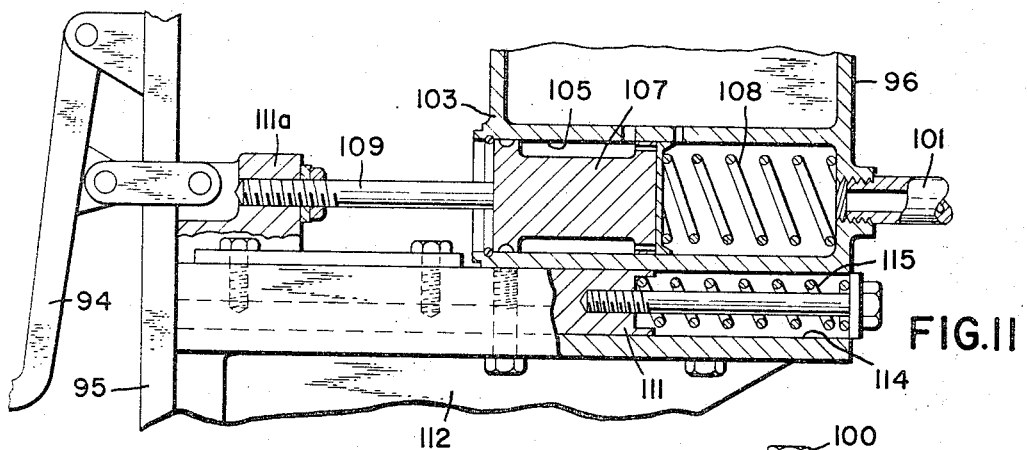
FIG. 11
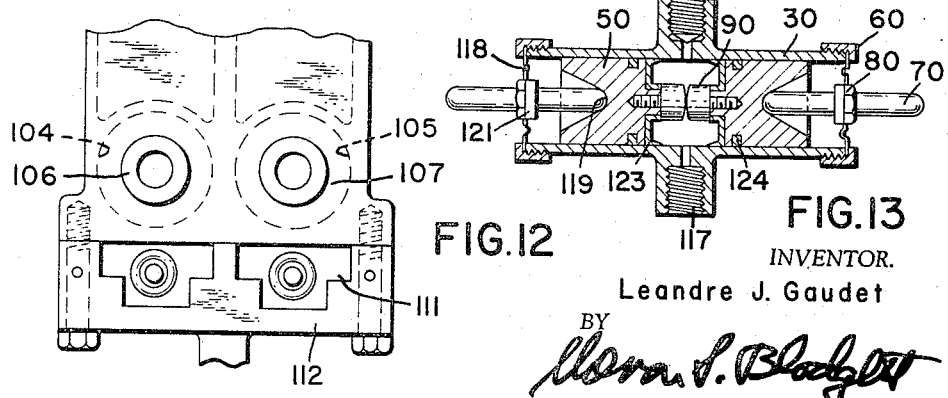
FIG. 12
FIG. 13
INVENTOR.
Leandre J. Gaudet
BY
*Norm S. Blodgett*
ATTORNEY 3,379,287
PLURAL ACTUATED BRAKE SYSTEM
Leandre J. Gaudet, 22 Kendall St., Worcester, Mass. 01605; Matilda M. Gaudet, administratrix of said Leandre J. Gaudet, deceased
Filed Mar. 18, 1966, Ser. No. 535,429
5 Claims. (Cl. 188—152)

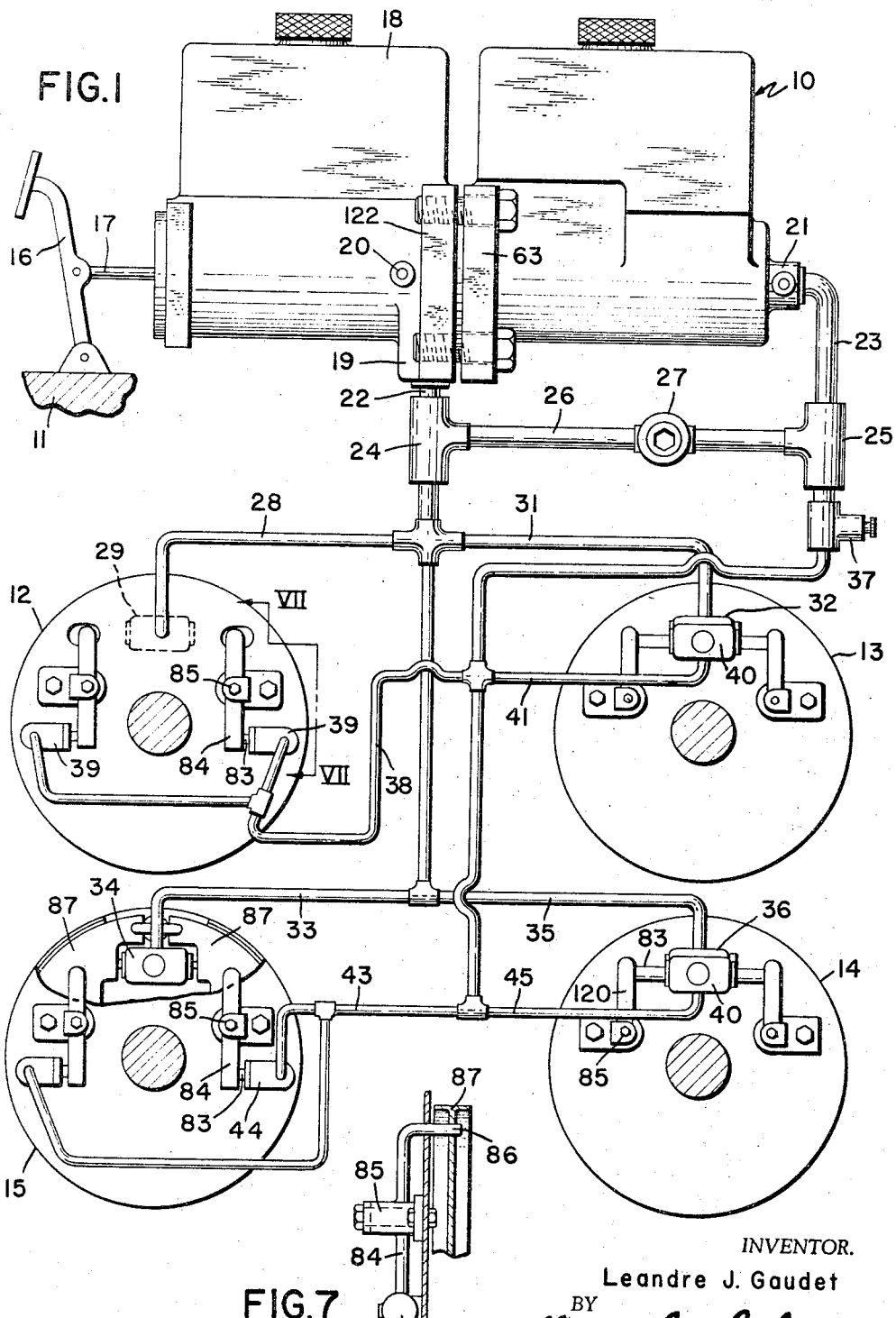

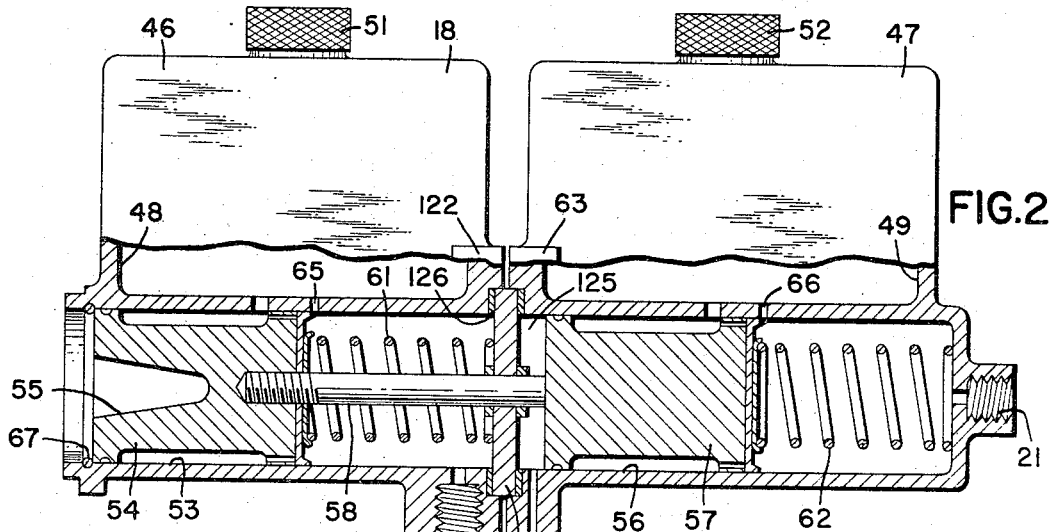

This invention relates to an automotive brake system and, more particularly, to a dual four-wheel braking system for a vehicle, such as an automobile.

It is conventional practice to utilize in an automobile a hydraulic braking system consisting of a master cylinder mechanically connected to a brake pedal. During a brake application, a piston within the master cylinder applies hydraulic pressure to fluid which is distributed through tubing to wheel cylinders. The wheel cylinders then operate the wheel braking mechanism. Such a system has an inherent disadvantage in that all the wheel cylinders are connected to a single hydraulic circuit, so that a leak in any part of the hydraulic circuitry leads to a total brake failure. At the present time, dual master cylinders are used to attempt to overcome this disadvantage; the conventional hydraulic circuit is separated into two sections, one operating the rear wheels and the other operating the front wheels. There is, however, a disadvantage in separating the front and rear brakes hydraulically. Assuming that there is a failure in the hydraulic circuit operating the rear wheels, when the brake pedal is depressed, unless the front wheels are perfectly adjusted, there is a tendency to cause the vehicle to skid while driving in a forward direction and, even more so while rounding a curve. Another disadvantage in separating the front and rear brakes hydraulically is the loss of braking effectiveness.

It is, therefore, an outstanding object of the invention to provide an automotive braking system providing two separate four-wheel braking arrangements for greater vehicle directional stability and deceleration.

Another object of this invention is the provision of an automotive braking system which has the same braking potential when either section of a dual four-wheel braking system is functioning in the absence of the other.

A further object of the present invention is the provision of an automotive braking system which will indicate that there is a failure in one of its parts, specifically, by a light associated with a warning device on the instrument panel.

It is another object of the instant invention to provide an automotive braking system adapted to use with cylinders for operating two separate braking systems for four, six, eight, and ten wheel vehicles.

It is a still further object of the invention to provide an automotive braking system which will operate as a conventional braking system in the event that failure has occurred in a power booster.

A still further object of this invention is the provision of an automotive braking system which will operate as two separate braking systems without the use of valves.

It is a still further object of the present invention to provide an automotive braking system which, in the event of failure of a portion of the system, will not cause swerving or skidding of the automobile.

With these and other objects in view, as will be apparent to those skilled in the art, the invention resides in the combination of parts set forth in the specification and covered by the claims appended hereto.

The character of the invention, however, may be best understood by reference to certain of its structural forms, as illustrated by the accompanying drawings in which:

FIG. 1 is a somewhat schematic view of an automotive braking system embodying the principles of the present invention, FIG. 2 is a side view of a master cylinder forming part of the invention with portions broken away, FIG. 3 is an elevational view of one end of the master cylinder, FIG. 4 is an opposite end view of the master cylinder, FIG. 5 is a sectional view of a volume displacing device forming part of the invention, FIG. 6 is another view of the device shown in FIG. 5 with the parts in different conditions, FIG. 7 is a sectional view of the apparatus taken on the line VII—VII of FIG. 1, FIG. 8 is a sectional view of a wheel cylinder, FIG. 9 is a schematic view of an automotive braking system showing an alternative construction of the master cylinder, FIG. 10 is a plan view of the master brake of the system shown in FIG. 9, FIG. 11 is a side view of the master cylinder shown in FIG. 10 with portions broken away, and FIG. 12 is an end view of the master cylinder shown in FIG. 10.

Referring first to FIG. 1, which best shows the general features of the invention, the automotive master cylinder, indicated generally by the reference numeral 10, is shown associated with a vehicle 11 having four wheels 12, 13, 14, and 15. The wheels 12 and 15 are the front wheels and the wheels 13 and 14 are the rear wheels. Mounted on the vehicle 11 is a brake pedal 16 which acts on a piston rod 17 extending from one end of a master cylinder 18.

The master cylinder 18 is provided with two exit ports 19 and 21, there being a residual check valve (not shown) associated with each port in the usual way. A conduit 22 extends from the exit port 19 and a conduit 23 extends from the port 21. The conduit 22 is connected to a T-fitting 24, while the conduit 23 is connected to a T-fitting 25. The T-fittings 24 and 25 are connected by a conduit 26 containing a valve 27. The fitting 24 is connected to a primary wheel cylinder 29 associated with the front wheel 12. Similarly, the fitting 24 is connected by a conduit 31 to a primary wheel cylinder 32 associated with the rear wheel 13. It is also connected by a conduit 33 to a primary wheel cylinder 34 associated with the front wheel 15 and by a conduit 35 to a primary wheel cylinder 36 associated with the rear wheel 14. In a conventional brake assembly, the primary cylinders 29, 32, 34, and 36 are placed inside of the brake drum. To simplify the illustration and eliminate unnecessary drawing, the wheel cylinders are placed outside as depicted in FIG. 1.

The fitting 25 is connected to a volume-displacing device 37 which, in turn, is connected through a conduit 38 to two secondary half wheel cylinders 39 associated with the front wheel 12, through a conduit 41 to a secondary wheel cylinder 40 associated with the rear wheel 13, through a conduit 43 to two secondary wheel cylinders 44 associated with the wheel 15, and through a conduit 45 to a secondary wheel cylinder 40 associated with the rear wheel 14. A section of the backing plate opens to reveal two brake shoes 87 with a primary cylinder 34 interposed between the two opposing brake shoes 87 of a conventional duo-servo brake system. Also, in FIG. 1, front wheels 12 and 15, the half wheel cylinders 44–39 and the long levers 84 are adapted to the front wheels for allowing the front wheels to pivot around the king pin; on the rear wheel 14, a single wheel cylinder and short levers are used.

Referring to FIGS. 2, 3, and 4, which show various views of the master cylinder 18, it can be seen that it consists of two main bodies 46 and 47 containing reservoirs 48 and 49 at the top of which are supply openings 51 and 52, respectively. Extending horizontally through the body 46 under the reservoir 48 is a cylinder or bore 53 in which is slidably carried a piston 54. The left-hand end of the piston is provided with a socket 55 adapted to be engaged by the piston rod 17 associated with the brake pedal 16. Similarly, the body 47 is provided with a bore 56 underlying the reservoir 49 and of approximately the same size and in alignment with the bore 53. The bore 56 carries another piston 57 and the two pistons are connected together by a connecting rod 58. Furthermore, between the two bodies 46 and 47 and acting as a separating wall between the bores 53 and 56 is a wall or partition 59 through which the rod 58 extends. Suitable seals are provided around the rod. A coil spring 61 extends under compression between the partition 59 and the facing end of the piston 54, while a similar coil spring 62 extends between the right-hand end of the bore 56 and the facing end of the piston 57. An outlet port 19 extends through the wall of the body 46 at the end of the bore 53 adjacent the partition 59, while a similar outlet port 21 extends from the end of the bore 56. An air vent 64 extends through the body 47 in the bore 56 adjacent the partition 59. In the usual way, suitable by-pass ports 65 and 66 extend through the wall separating the reservoirs 48 and 49 from the bores 53 and 56, respectively. As is evident in FIGS. 3 and 4, the outer end of the bore 53 is provided with a snap ring 67 to limit movement of the piston 54 outwardly and the housing 46 is provided with a laterally-extending flange 68 to be used for assembling the power cylinder to the power booster. FIG. 4 shows the manner in which the body 47 is provided with a flange 63 by which it is bolted to a corresponding flange 122 formed on the body 46 in FIG. 3.

Referring now to FIGS. 5 and 6, the volume displacement device 37 is shown as provided with a generally cylindrical body 69 provided with a bore 71. Sliding in the bore is a free piston 72 which is maintained at a left-hand position in the bore 71 by a coil spring 73. Extending through the right-hand end of the body 69 is an adjustable stop 74 and from the left-hand side of the piston 72 extends an abutment 75. The body 69 is provided with an inlet port 76 and an outlet port 77 joined by a passage 78 across which the abutment extends without shutting off the passage. Mounted in the wall of the body 69 and having an actuating finger protruding into the bore 71 is a switch 79 which is suitably connected in series with the automobile battery 81 and with a signal apparatus, such as an incandescent lamp 82 mounted on the instrument panel. The switch 79 is located in such a manner that, as the piston 72 moves to the right it contacts the switch and lights the lamp 82. Another signal lamp 20 is similarly connected to the primary master cylinder 18.

FIGS. 1 and 7 show the details of the brake actuators associated with the wheel 15. The secondary half wheel cylinder 44 has extending from it a piston rod 83 which contacts the lower end of a lever 84 which, in turn, is pivotally carried in a bearing 85 mounted on the backing plate. The upper end of the lever 84 is bent at a right angle to provide a finger 86 which contacts a brake shoe member 87 for the operation thereof. This same brake shoe member is contacted by the piston rod of the primary wheel cylinder 34. A similar arrangement between the other end of the primary wheel cylinder 29 and another secondary wheel cylinder operates at the other side of the wheel 12 so that each front wheel is provided with a double set of secondary half wheel cylinders as well as a double-acting primary wheel cylinder and the rear wheels with a double-acting primary and secondary wheel cylinder.

FIG. 8 shows the details of the secondary wheel cylinder 39 which is a half wheel cylinder having a generally cylindrical body 88 formed with an axial bore 89 carrying a piston 91. The piston is operatively connected to the rod 83 by a socket arrangement. A bellows-type seal 92 permits the piston to run in and out of the cylinder preventing air from entering the wheel cylinder. The body 88 is provided with an inlet port 93 connected to the right-hand end of the bore 89 for the operation of the piston 91 by the admission of hydraulic fluid.

The operation of the apparatus will now be readily understood in view of the above description. When the operator of the vehicle 11 steps on the brake pedal 16 and drives the rod 17 toward the master cylinder 18, the piston 54 compresses fluid at the other end of the bore 53 and presses it through the port 19. This flows through the conduit 22 and the fitting 24 to the conduits 28, 31, 33, and 35. These conduits are connected to the primary wheel cylinders 29, 32, 34, and 36, respectively, associated with the wheels 12, 13, 15, and 14. If this primary braking system is free of leaks and is operating efficiently, the primary warning device on instrument panel will indicate that the circuit is intact and the car will be brought to a halt by the operation. For instance, in the case of the wheel 15 of the primary wheel cylinder 34, the piston rods extend in both directions and operate the brake shoes member 87. At the same time that the brake pedal 16 presses the piston 54 to the right, it does the same thing to the piston 57 because of the connecting rod 58 joining the two. The fluid is ejected from the right-hand end of the bore 56 through the exit port 21 and passes through the conduit 23 and the fitting 25, and there is no braking pressure applied to the secondary wheel cylinders. The displacement device 37 provides a lower differential pressure in the secondary system when the primary system is fully operative. When the pressure in the primary system falls below that in the secondary system, the arrival of the added pressure and flow of hydraulic fluid at the volume displacement device 37 causes the piston 72 to move to the right against the tension of the spring 73. Before the brake pedal was depressed, the device appears as it does in FIG. 5. Somewhere in its passage from left to right, the piston 72 strikes the switch 79 and lights up the lamp 82, indicating to the occupant of the car that the secondary braking system is operative, if he should need it. In the normal case, the primary braking system will operate the brake shoe members 87 and bring the vehicle to a stop and at the same time the secondary system expands to accept the fluid without, however, applying braking pressure to the brake shoes. When the primary system is fully operative the pistons in the secondary wheel cylinders 39, 40 and 44 can expand to accept the fluid but insufficient braking pressure is applied thereto. If there is a leak or some other malfunction, however, the car will not be stopped by the primary braking system. Eventually, then, the fluid which has been pressed from the exit port 21 by the piston 57 will force the piston 72 of the volume displacement device 37 to the extreme right position into contact with the stop 74. When this has been done, any added movement of the piston 57 to the right will cause fluid to pass through the conduits 38, 41, 43, and 45 to the secondary wheel cylinders 39, 42, 44, and 40, respectively. These wheel cylinders will act in a manner similar to the wheel cylinder 29, i.e., the piston rod 83 will strike the lower end of the lever 84 of the front wheel and top of lever of rear wheel 14 causing it to rotate about the piston defined by the bearing 85. This means that the upper end of the lever and the finger 86 will bring about movement of the brake shoes member 87 and bring the car to a halt.

It can be seen, then, that the operation of the present system causes the primary braking system to come into effect first. If it is ineffective to operate to stop the vehicle and there is no pressure in the master cylinder 18 to operate its signal device 20 and this is made evident to the operator; then the secondary system comes into play. Furthermore, an indicating device is used to assure the driver that the secondary system is available for him to use, if the primary system should fail. If there were a defect in the secondary braking system, the fluid would leak out through the defect and the piston 72 would not move to the right and would not strike the switch 79 and it would not light the indicator lamp 82. The operator of the vehicle would know, then, that his secondary system was in a state of disrepair and should be repaired.

FIGS. 9 through 12 show a variation or modification of the apparatus. FIG. 9 shows the general system of a brake pedal 94 mounted on the fire wall 95 of a motor vehicle and operating a master cylinder 96 having two pistons and cylinders, one of which is connected through a primary conduit system 97 to operate the primary wheel cylinders 98 of the wheels 99 of the vehicle. Similarly, the master cylinder 96 operates through a secondary conduit system 101 to operate the secondary wheel cylinders 102 of the wheels 99. The master cylinder 96 is provided with a main body 103 through which extend two horizontal parallel spaced bores 104 and 105 carrying pistons 106 and 107, respectively. The pistons 106 and 107 and their bores 104 and 105 are typical, there being a compression spring 108 extending between the end of the piston and the other end of the bore, the outlet end being connected to the secondary conduit system 101. The outlets of the bores 104 and 105 in FIGS. 11 and 12 must also contain a check valve connected to brake tubing 97 and 101; the two conduits 97 and 101 must be connected by the conduit 26 and valve 27 depicted in FIG. 1. A rod 109 is mounted coaxially of the piston 106 and is engageable with the left-hand end thereof. The other end of the rod 109 is mounted in a vertically protruding block 111A made integral with the slide 111 and connected to the pedal 94 by mechanical linkage. The slide is made to reciprocate in the T-slot 114 machined in the base of the angle plate 112 and returned to its predetermined position by the spring 115. A similar rod 116 extends between the block 111A and the primary piston 107 which operates in its bore 105 to cause fluid to flow from the right-hand end into the primary conduit system 97. The diameter of the bore 104 of the secondary brake system is slightly larger than the bore 105 of the primary braking system, so that the secondary piston 106 forces oil into the secondary braking system at a much faster rate than is accomplished by the primary system. This is accomplished in the case of the master cylinder 18 shown in FIG. 2 because of the presence of the connecting rod 58 occupying part of the area of the bore 53. This process of pressing fluid out of the secondary piston system faster than it is pressed out of the primary system is to cause the volume displacement device 37 to operate effectively. In the case of the master cylinder 96, shown in FIGS. 9 through 12, this effect is accomplished by making the secondary bore 104 slightly larger than the primary bore 105.

A typical wheel cylinder 30 shown in FIG. 13 contains two slidable pistons 50 with a piston cup and a secondary seal 118 adapted to each piston. The cups are assembled to the piston by round-head screws 90 abutting each other to provide an oil chamber. A brake shoe actuating plunger 70 is placed in a conical hole 119 of each piston and the other end in a conical hole at top of short levers 120 of rear wheel 14 in FIG. 1. Both plungers 70 are machined with a shoulder 121 for a flexible dust boot 118 and made fast by the machine nut 80. An internal threaded cap 60 is assembled to body 30 and tightened against the dust boot 118 preventing air from entering into wheel cylinder. A threaded outlet is for the reception of a bleeder screw 100 and the outlet 117 is connected to the secondary hydraulic circuit.

It can be seen that, in the present invention, the primary braking system receives fluids slower than the secondary braking system in the sense that its piston and cylinder arrangement cause less fluid to flow into the system for a given deflection of the pedal. However, the secondary system has a volume take-up arrangement which makes the fluid of the secondary system effective to operate the secondary braking system only after the primary system has had plenty of time to accomplish its purpose. This means that the secondary system is inoperative to actuate the secondary brake cylinders unless a primary master cylinder is inoperative to actuate the primary wheel cylinders. After the initial pedal motion, the brake shoes 87 in FIG. 7 are made to contact the inside of brake drums by the pressured fluid in the primary bore of master cylinder through the wheel cylinder 29 of wheel 12 in FIG. 1. With both hydraulic circuits replenished with fluid, the stop 74 is adjusted with approximately one eighth of an inch clearance between the piston to minimize pedal travel.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An automotive brake system, comprising
    (a) a vehicle having a plurality of wheels, each wheel having a primary and a secondary wheel cylinder,
    (b) a master cylinder having two pistons in respective cylinders operable from a single pedal,
    (c) a first conduit system connecting one of the cylinders to the primary wheel cylinders and a second conduit system connecting the other of the cylinders to the secondary wheel cylinders, and
    (d) a volume displacement device operatively connected within said second conduit system between said other cylinder and said secondary wheel cylinders, said device comprising a cylindrical body provided with a bore, a spring-biased member movable in said cylindrical body, an inlet port in said cylindrical body connecting said second conduit system and said other cylinder and an outlet port in said cylindrical body connecting said second conduit system and said secondary wheel cylinders.

2. An automotive brake system as recited in claim 1, wherein the device includes an electric signal operated by the movement of the member.

3. An automotive brake system as recited in claim 1, wherein the device includes an adjustable stop and wherein the movement of the member to contact the stop renders the said other of the cylinders operative to apply braking pressure to the secondary wheel cylinders.

4. An automotive brake system as recited in claim 1, wherein the primary wheel cylinder has a piston rod which presses against a braking element and wherein the secondary wheel cylinder has a piston rod which acts on a lever which, in turn, presses against the braking element.

5. An automotive brake system as recited in claim 1, wherein the said other of the cylinders displaces a greater volume of fluid for a given pedal movement than the said one of the cylinders.

References Cited

UNITED STATES PATENTS

| 1,567,982 | 12/1925 | Pfeiffer | 188—106 |
| 1,652,232 | 12/1927 | Blasdel | 188—152 |
| 3,015,522 | 1/1962 | Spikes | 188—106 XR |
| 3,065,830 | 11/1962 | Krotz | 188—112 |

FOREIGN PATENTS

| 1,342,684 | 9/1963 | France. |
| 424,911 | 3/1935 | Great Britain. |
| 460,676 | 12/1950 | Italy. |

FERGUS S. MIDDLETON, *Primary Examiner.*

MILTON BUCHLER, *Examiner.*

B. S. MOWRY, G. E. HALVOSA,
*Assistant Examiners.*